US012407980B2

(12) United States Patent
Smolen et al.

(10) Patent No.: US 12,407,980 B2
(45) Date of Patent: Sep. 2, 2025

(54) CUSTOMIZABLE WAVEGUIDES AND ASSOCIATED SYSTEMS AND METHODS

(71) Applicant: QSC, LLC, Costa Mesa, CA (US)

(72) Inventors: Chris Smolen, Costa Mesa, CA (US); Bernie Hawkins, Costa Mesa, CA (US)

(73) Assignee: QSC, LLC, Costa Mesa, CA (US)

( * ) Notice: Subject to any disclaimer, the term of this patent is extended or adjusted under 35 U.S.C. 154(b) by 282 days.

(21) Appl. No.: 18/177,081

(22) Filed: Mar. 1, 2023

(65) Prior Publication Data

US 2024/0298110 A1 Sep. 5, 2024

(51) Int. Cl.
*H04R 1/34* (2006.01)
*H04R 1/02* (2006.01)
*H04R 1/30* (2006.01)
*H04R 1/40* (2006.01)

(52) U.S. Cl.
CPC ............ *H04R 1/345* (2013.01); *H04R 1/025* (2013.01); *H04R 1/30* (2013.01); *H04R 1/403* (2013.01)

(58) Field of Classification Search
CPC .......... H04R 1/345; H04R 1/025; H04R 1/30; H04R 1/403
USPC .......................................................... 381/337
See application file for complete search history.

(56) References Cited

U.S. PATENT DOCUMENTS 5,020,630 A 6/1991 Gunness
5,988,314 A 11/1999 Negishi
6,028,947 A * 2/2000 Faraone .................. H04R 1/30 381/337
6,879,297 B2 4/2005 Brown et al.
6,942,620 B2 9/2005 Nita et al.
6,950,530 B2 9/2005 Baird et al.
7,002,528 B2 2/2006 Moheb
7,044,265 B2 5/2006 Murphy
(Continued)

FOREIGN PATENT DOCUMENTS

KR 101224814 B1 1/2013
NL 1030661 C2 6/2007
(Continued)

OTHER PUBLICATIONS

QSC, LLC. , "Images for Horn Insert Art Search", QSC, LLC., Acoustic Wave Guide with Asymmetrical Inserts.
(Continued)

*Primary Examiner* — Sean H Nguyen
(74) *Attorney, Agent, or Firm* — Perkins Coie LLP

(57) ABSTRACT

Customizable waveguides for use in a loudspeaker and associated systems and methods are disclosed herein. In some embodiments, the waveguide includes a frame and a waveguide insert sealably couplable to the frame. The frame can include a first end region that can be coupled to a compression driver in the loudspeaker and a second end region opposite the first end region. The second end region can be coupled to a front baffle of the loudspeaker when the first end region is coupled to the compression driver. Further, the frame can be symmetric about vertical and/or horizontal axes of the frame. The waveguide insert can include a first half-horn couplable to a first longitudinal half of the frame, a second half-horn couplable to a second longitudinal half of the frame opposite the first longitudinal half, and a divider positioned between the first half-horn and the second half-horn.

20 Claims, 9 Drawing Sheets

(56) References Cited

U.S. PATENT DOCUMENTS

| | | | |
|---|---|---|---|
| 7,110,716 | B2 | 9/2006 | Rao et al. |
| 7,178,629 | B2 | 2/2007 | Vincenot |
| 7,203,329 | B2 | 4/2007 | Alexander et al. |
| 7,268,467 | B2 | 9/2007 | De |
| 7,275,621 | B1 | 10/2007 | Delgado |
| 7,297,238 | B2 | 11/2007 | Nayar et al. |
| 7,299,893 | B2 | 11/2007 | Meyer et al. |
| 7,360,499 | B1 | 4/2008 | Oneill |
| 7,372,398 | B2 | 5/2008 | Chandler |
| 7,454,030 | B2 | 11/2008 | Graber |
| 7,590,257 | B1 | 9/2009 | Blanchard et al. |
| 7,617,794 | B2 | 11/2009 | Chlystek |
| 7,629,937 | B2 | 12/2009 | Lier et al. |
| 7,631,724 | B2 | 12/2009 | Onishi |
| 7,686,129 | B2 | 3/2010 | Delgado |
| 7,690,548 | B2 | 4/2010 | Mlinar et al. |
| 7,712,430 | B2 | 5/2010 | Solow |
| 7,737,904 | B2 | 6/2010 | Rao et al. |
| 7,775,413 | B2 | 8/2010 | Oblak et al. |
| 7,802,535 | B2 | 9/2010 | Solow |
| 7,820,249 | B2 | 10/2010 | Nayar et al. |
| 7,837,006 | B1 | 11/2010 | Graber |
| 7,889,148 | B2 | 2/2011 | Diaz et al. |
| 7,936,892 | B2 | 5/2011 | Werner |
| 7,938,078 | B2 | 5/2011 | Solow |
| 7,983,857 | B2 | 7/2011 | Oblak et al. |
| 7,992,366 | B2 | 8/2011 | McCarthy |
| 8,004,390 | B2 | 8/2011 | Solow |
| 8,006,463 | B2 | 8/2011 | May et al. |
| 8,050,442 | B1 | 11/2011 | Graber |
| 8,057,573 | B2 | 11/2011 | Koenig et al. |
| 8,072,386 | B2 | 12/2011 | Lier et al. |
| 8,094,854 | B2 | 1/2012 | Dodd |
| 8,130,994 | B2 | 3/2012 | Button et al. |
| 8,149,097 | B2 | 4/2012 | Solow |
| 8,191,496 | B2 | 6/2012 | Fishman |
| 8,191,674 | B2 | 6/2012 | Thompson |
| 8,204,245 | B2 | 6/2012 | Tobin et al. |
| 8,205,712 | B2 | 6/2012 | Dickie |
| 8,231,795 | B2 | 7/2012 | Martin et al. |
| 8,265,320 | B2 | 9/2012 | Datz et al. |
| 8,300,869 | B2 | 10/2012 | Marlin et al. |
| 8,306,429 | B2 | 11/2012 | Hashimoto et al. |
| 8,312,957 | B1 | 11/2012 | Stoltzfus |
| 8,408,445 | B1 | 4/2013 | Cai et al. |
| 8,411,892 | B2 | 4/2013 | Grundland et al. |
| 8,469,140 | B1 | 6/2013 | Graber |
| 8,474,229 | B2 | 7/2013 | McCarthy |
| 8,477,075 | B2 | 7/2013 | Seifried et al. |
| 8,477,979 | B2 | 7/2013 | Oneill |
| 8,494,815 | B2 | 7/2013 | Zander et al. |
| 8,550,376 | B2 | 10/2013 | Munn et al. |
| 8,607,922 | B1 | 12/2013 | Werner |
| 8,641,630 | B2 | 2/2014 | Nita et al. |
| 8,666,104 | B2 | 3/2014 | Ivey et al. |
| 8,687,835 | B2 | 4/2014 | Solow |
| 8,730,119 | B2 | 5/2014 | Runyon et al. |
| 8,757,318 | B2 | 6/2014 | Runciman et al. |
| 8,786,508 | B1 | 7/2014 | Edwards et al. |
| 8,798,303 | B2 | 8/2014 | Hsu Huang et al. |
| 8,847,838 | B2 | 9/2014 | Walpole |
| 8,858,742 | B2 | 10/2014 | Spicer et al. |
| 8,886,498 | B2 | 11/2014 | Badiey et al. |
| 8,902,116 | B2 | 12/2014 | Huang et al. |
| 8,909,419 | B2 | 12/2014 | Park |
| 8,963,791 | B1 | 2/2015 | Edwards et al. |
| 8,989,947 | B2 | 3/2015 | Wethern |
| 8,995,700 | B2 | 3/2015 | Bothe |
| 9,035,842 | B2 | 5/2015 | Tahmisian et al. |
| 9,088,850 | B2 | 7/2015 | Martin et al. |
| 9,216,540 | B2 | 12/2015 | Weiland et al. |
| 9,227,585 | B1 | 1/2016 | Barbat et al. |
| 9,246,226 | B2 | 1/2016 | Voss et al. |
| 9,275,628 | B2 | 3/2016 | Schnitta et al. |
| 9,279,716 | B2 | 3/2016 | Snider et al. |
| 9,283,498 | B2 | 3/2016 | Takenouchi |
| 9,293,831 | B1 | 3/2016 | Harker et al. |
| 9,293,835 | B2 | 3/2016 | Clymer et al. |
| 9,295,229 | B2 | 3/2016 | Mills |
| 9,318,087 | B2 | 4/2016 | Solow |
| 9,318,810 | B2 | 4/2016 | Zelenski |
| 9,386,361 | B2 | 7/2016 | Sprinkle |
| 9,387,897 | B2 | 7/2016 | Orzeck et al. |
| 9,392,358 | B2 | 7/2016 | Delay et al. |
| 9,470,732 | B2 | 10/2016 | Reynolds et al. |
| 9,474,542 | B2 | 10/2016 | Slipszenko et al. |
| 9,503,807 | B2 | 11/2016 | Murphy |
| 9,583,840 | B1 | 2/2017 | Lawrance |
| 9,589,429 | B2 | 3/2017 | Sun |
| 9,653,064 | B2 | 5/2017 | Graber |
| 9,661,412 | B2 | 5/2017 | Yan et al. |
| 9,666,949 | B2 | 5/2017 | Miller et al. |
| 9,698,492 | B2 | 7/2017 | Rao et al. |
| 9,706,289 | B2 | 7/2017 | Adamson et al. |
| 9,716,316 | B2 | 7/2017 | Park et al. |
| 9,742,069 | B1 | 8/2017 | Hollenbeck et al. |
| 9,754,578 | B2 | 9/2017 | Smithers |
| 9,768,508 | B2 | 9/2017 | Hwang et al. |
| 9,769,560 | B2 | 9/2017 | Button |
| 9,812,784 | B2 | 11/2017 | Park et al. |
| 9,855,172 | B2 | 1/2018 | Shimada |
| 9,861,522 | B2 | 1/2018 | Sorensen et al. |
| 9,872,100 | B2 | 1/2018 | Henry et al. |
| 9,924,249 | B2 | 3/2018 | Sprinkle |
| 9,960,495 | B1 | 5/2018 | Hollenbeck et al. |
| 9,967,652 | B2 | 5/2018 | Baird et al. |
| 10,005,388 | B1 | 6/2018 | Kim |
| 10,015,583 | B2 | 7/2018 | Arneson et al. |
| 10,046,874 | B2 | 8/2018 | Aurand |
| 10,110,993 | B1 | 10/2018 | Heebner et al. |
| 10,122,066 | B2 | 11/2018 | Ito et al. |
| 10,158,177 | B2 | 12/2018 | Cook |
| 10,158,938 | B1 | 12/2018 | Jang et al. |
| 10,191,471 | B2 | 1/2019 | Spicer et al. |
| 10,193,227 | B2 | 1/2019 | Chang et al. |
| 10,194,238 | B2 | 1/2019 | Button et al. |
| 10,218,076 | B1 | 2/2019 | Bhardwaj et al. |
| 10,236,586 | B2 | 3/2019 | Zelenski |
| 10,239,150 | B2 | 3/2019 | Cooper et al. |
| 10,304,651 | B2 | 5/2019 | Fallahi et al. |
| 10,327,827 | B2 | 6/2019 | Young et al. |
| 10,334,355 | B2 | 6/2019 | Johnson et al. |
| 10,349,166 | B2 | 7/2019 | Sahyoun |
| 10,349,964 | B2 | 7/2019 | Nita et al. |
| 10,355,359 | B1 | 7/2019 | Butscher et al. |
| 10,375,470 | B2 | 8/2019 | Bisset et al. |
| 10,454,177 | B2 | 10/2019 | Kozyrev |
| 10,468,773 | B2 | 11/2019 | Hollenbeck et al. |
| 10,469,942 | B2 | 11/2019 | Bezzola |
| 10,476,141 | B2 | 11/2019 | Marrero-Fontanez et al. |
| 10,501,180 | B2 | 12/2019 | Yu |
| 10,506,331 | B2 | 12/2019 | Baird et al. |
| 10,506,339 | B2 | 12/2019 | Dunn et al. |
| 10,524,042 | B2 | 12/2019 | Brousseau et al. |
| 10,531,185 | B1 | 1/2020 | Lang |
| 10,559,885 | B2 | 2/2020 | Morgan |
| 10,602,263 | B2 | 3/2020 | Smithers et al. |
| 10,608,476 | B2 | 3/2020 | Criswell et al. |
| 10,612,967 | B2 | 4/2020 | Agranat et al. |
| 10,658,756 | B1 | 5/2020 | Marrero-Fontanez et al. |
| 10,658,760 | B2 | 5/2020 | Kamo et al. |
| 10,665,931 | B2 | 5/2020 | Lier et al. |
| 10,667,036 | B2 | 5/2020 | Kim |
| 10,714,834 | B2 | 7/2020 | Diaz et al. |
| 10,726,823 | B2 | 7/2020 | Solow |
| 10,727,611 | B2 | 7/2020 | Kirino et al. |
| 10,746,774 | B2 | 8/2020 | Varadan |
| 10,753,599 | B1 | 8/2020 | Hsu |
| 10,777,172 | B1 | 9/2020 | Katzenberger |
| 10,779,081 | B2 | 9/2020 | Chen |
| 10,790,591 | B2 | 9/2020 | Rowell et al. |
| 10,807,750 | B2 | 10/2020 | Kimura et al. |
| 10,809,114 | B2 | 10/2020 | Uddh et al. |
| 10,848,858 | B2 | 11/2020 | Halley et al. |

(56) References Cited

U.S. PATENT DOCUMENTS

| | | | |
|---|---|---|---|
| 10,848,862 B2 | 11/2020 | Showalter et al. | |
| 10,902,833 B2 | 1/2021 | Solow | |
| 10,965,041 B2 | 3/2021 | Taptic et al. | |
| 10,986,902 B2 | 4/2021 | Loetscher | |
| 10,993,512 B2 | 5/2021 | Rochat | |
| 11,012,773 B2 | 5/2021 | Bezzola | |
| 11,044,551 B2 | 6/2021 | Spillmann et al. | |
| 11,108,161 B2 | 8/2021 | Rockberger et al. | |
| 11,158,949 B2 | 10/2021 | Mast et al. | |
| 11,196,178 B2 | 12/2021 | Fleancu et al. | |
| 11,217,901 B1 | 1/2022 | Wink et al. | |
| 11,229,449 B2 | 1/2022 | Tschudy et al. | |
| 11,240,593 B2 | 2/2022 | Halley et al. | |
| 11,246,617 B2 | 2/2022 | Cowley | |
| 11,246,621 B2 | 2/2022 | Cowley | |
| 11,252,500 B2 | 2/2022 | Showalter et al. | |
| 11,282,489 B2 | 3/2022 | Wan | |
| 11,289,816 B2 | 3/2022 | Othmezouri et al. | |
| 11,292,522 B2 | 4/2022 | Gombert et al. | |
| 11,307,232 B1 | 4/2022 | Sherry et al. | |
| 11,329,391 B2 | 5/2022 | Runyon et al. | |
| 11,362,427 B2 | 6/2022 | Mast et al. | |
| 11,426,189 B2 | 8/2022 | Nita et al. | |
| 11,437,727 B2 | 9/2022 | Boin | |
| 11,457,306 B1 | 9/2022 | Jenson et al. | |
| 11,509,997 B2 * | 11/2022 | Halley | H04R 1/025 |
| 2009/0277713 A1 | 11/2009 | Thopson | |
| 2015/0172795 A1 * | 6/2015 | Roberts | H04R 1/00 381/98 |
| 2017/0251296 A1 | 8/2017 | Smithers | |
| 2019/0158955 A1 * | 5/2019 | Zingali | H04R 1/30 |
| 2019/0222926 A1 | 7/2019 | Showalter et al. | |
| 2019/0394562 A1 | 12/2019 | Rumyantsev | |
| 2020/0275196 A1 | 8/2020 | Delay | |
| 2020/0368524 A1 | 11/2020 | Bagwell et al. | |
| 2021/0085041 A1 | 3/2021 | Schlichtig et al. | |
| 2021/0221017 A1 | 7/2021 | Yagi et al. | |
| 2021/0368260 A1 | 11/2021 | Ferreira et al. | |
| 2022/0016850 A1 | 1/2022 | Burke | |
| 2022/0037793 A1 | 2/2022 | Hou et al. | |
| 2022/0053264 A1 | 2/2022 | Sun et al. | |
| 2022/0069478 A1 | 3/2022 | Wink et al. | |
| 2022/0146236 A1 | 5/2022 | Stark et al. | |
| 2022/0167081 A1 | 5/2022 | Showalter et al. | |
| 2022/0240888 A1 | 8/2022 | Abramov | |
| 2022/0276611 A1 | 9/2022 | Schlichtig et al. | |
| 2022/0279257 A1 | 9/2022 | Bothe | |

FOREIGN PATENT DOCUMENTS

| | | |
|---|---|---|
| WO | 2021224027 A1 | 11/2021 |
| WO | 2021249843 A1 | 12/2021 |
| WO | 2021252797 A1 | 12/2021 |
| WO | 2022000104 A1 | 1/2022 |
| WO | 2022002926 A1 | 1/2022 |
| WO | 2022004768 A1 | 1/2022 |
| WO | 2022024061 A1 | 2/2022 |
| WO | 2022137364 A1 | 6/2022 |

OTHER PUBLICATIONS

QSC, LLC. , "L038 Horn Design", QSC, LLC., Acoustic Wave Guide with Asymmetrical Inserts.

International Search Report from PCT/US2024/010745 dated Jun. 17, 2024 (6 pgs).

* cited by examiner

CUSTOMIZABLE WAVEGUIDES AND ASSOCIATED SYSTEMS AND METHODS

TECHNICAL FIELD

The present disclosure relates generally to speaker technology. More specifically, the present technology relates to customizable waveguides to shape acoustic waves from loudspeakers.

BACKGROUND

Loudspeakers typically use a waveguide (also referred to as a speaker horn) to improve the overall efficiency of the driving element in the speaker and to direct the resulting acoustic wave toward a target. For example, a typical loudspeaker has a compression driver that oscillates to produce sound waves. The compression driver is attached to a waveguide that improves the coupling between the compression driver and the surrounding air, for example by providing a form of impedance matching between the material of the compression driver and the air. To do so, waveguides have a narrow section (referred to as the "throat") coupled to the compression driver, a middle section (referred to as the "neck") that gradually expands to shape and expand the acoustic wave, and an end section (referred to as the "mouth") that projects the acoustic wave out of the speaker (e.g., is the part of the horn that interacts with external ambient air). As a result of the wave-shaping and impedance matching, the waveguide can significantly improve the sound output from the compression driver.

The shape of the neck can also impact the direction of the acoustic wave exiting the waveguide. Modern loudspeakers are manufactured with specific angles in their waveguides to better direct acoustic waves into the spaces that the loudspeakers are used in. For example, a wide-angle loudspeaker can be used to direct the acoustic waves generally into a large room (e.g., a conference room, concert hall, movie theater, and the like), while a narrow-angle loudspeaker can be used to fill in specific spaces in the room that are not well covered by the wide-angle loudspeaker.

Figure 1:
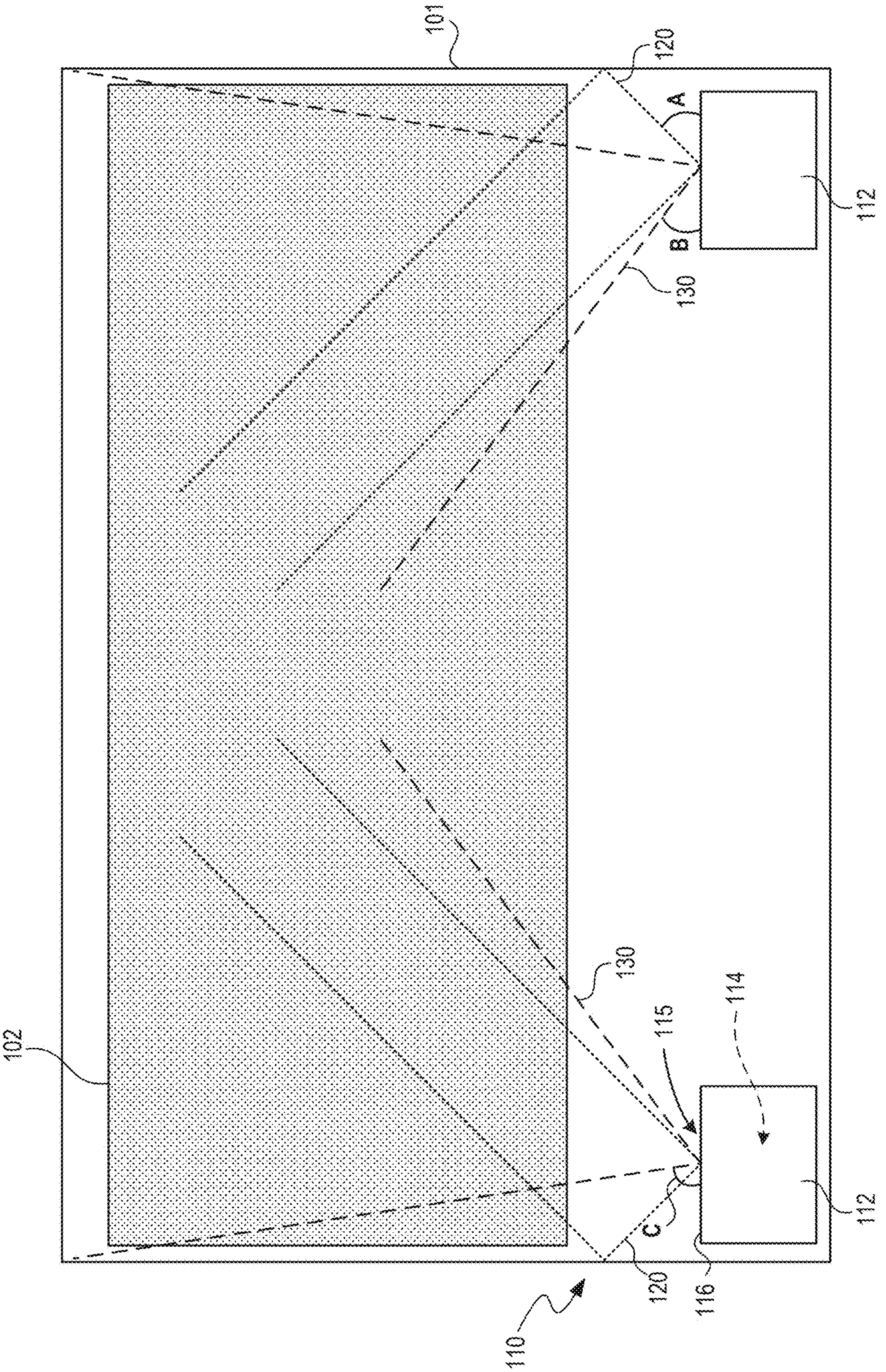
FIG. 1 is a schematic top view of a space employing loudspeakers with various beamwidths tailored to the space.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Loudspeaker systems can be manufactured with highly specialized waveguides and specific loudspeaker placement to create complex acoustic effects (e.g., surround sound, 3D sound environments, and the like) for spaces such as conference centers, concert halls, movie theaters, churches, and the like. More specifically, the loudspeakers can be created and placed in specific places to ensure complete acoustic coverage of the space with relatively few overlaps and/or dead zones. The overlaps can result in various distortions of the sound that undermine artistic intent and/or a listener's experience. Similarly, the dead zones can create pockets in the space that are not ideal for listeners in the audience. However, the loudspeakers created for these environments can be limited in use since they are specifically created for a particular environment and/or experience. Further, they may require particular placements of the loudspeakers that can be difficult to work around as an environment changes (e.g., as a conference center is altered between different conferences).

Loudspeakers having customizable waveguides and associated systems and methods that address these shortcomings are disclosed herein. A representative loudspeaker can include a compression driver (or other suitable driver, such as a piezo driver, a dome driver, a cone driver, and/or the like) positioned within a loudspeaker housing and directed toward a front baffle of the housing. The waveguide can include a frame operably couplable (or sealably coupled) between the compression driver and the front baffle, as well as a waveguide insert sealably couplable to the frame. The operable coupling can help direct any acoustic waves generated by the compression driver into the frame and toward the front baffle. The operable coupling can also secure the frame in position such that the acoustic waves do not vibrate (or otherwise move) the frame, which could result in distortion of the acoustic waves. A sealable coupling can help ensure that there are no (or very few) interfaces with ambient air (e.g., non-driven air within the speaker housing) through the frame and/or the waveguide insert. The sealable coupling can help allow the waveguide insert to shape an acoustic wave and perform any necessary impedance matching between the compression driver and the front baffle. As discussed in more detail below, the frame can provide a fixed structure while the waveguide insert can be customizable for a specific setting and/or use of the loudspeaker. Furthermore, the waveguide insert can be asymmetric about one or more axes and/or rotatable within the frame. As a result, the waveguide insert can allow a single loudspeaker to be configured to produce multiple different acoustic coverage angles.

The frame can include a first end region (e.g., a throat) that can be coupled to the compression driver in the loudspeaker and a second end region (e.g., a mouth) that can be coupled to the front baffle of the loudspeaker. In some embodiments, the frame can be symmetric about the vertical and/or horizontal axes of the frame. Purely by way of example, the mouth of the frame can have a generally square perimeter, allowing the waveguide insert to be rotated by 90 degrees to achieve varying coverages.

In some embodiments, the waveguide insert includes a first half-horn couplable to a first longitudinal half of the frame, a second half-horn couplable to a second longitudinal half of the frame, and a divider positionable between the first half-horn and the second half-horn. The first half-horn can have a first acoustic beamwidth while the second half-horn has a second acoustic beamwidth. The first and second beamwidths can be different, resulting in asymmetric coverage from the waveguide insert customizable to a specific space and/or intended use for the loudspeaker. For example, in some embodiments, the first half-horn and/or the second half-horn can be switched with various other half-horns with various other beamwidths. For example, the waveguide insert can be decoupled from the frame, the first half-horn and/or the second half-horn can be swapped with another half-horn, and the waveguide insert can be recoupled to the frame. The alterations can customize the acoustic coverage from the waveguide insert as needed for a space and/or specific use of the loudspeaker. Additionally, or alternatively, the waveguide insert can be decoupled from the frame, rotated about a longitudinal axis, and recoupled to the frame in a new orientation.

For ease of reference, loudspeakers, waveguides, and components thereof are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the loudspeakers, waveguides, and components thereof can be moved to, and used in, different spatial orientations without changing the structure and/or function of the disclosed embodiments of the present technology.

DESCRIPTION OF THE FIGURES

FIG. 1 is a schematic top view of a space 101 employing a loudspeaker system 110 with various acoustic beamwidths. In various embodiments, the space 101 can be a conference room, a concert hall, a movie theater, and/or any various other rooms (or outdoor spaces) in which loudspeakers are utilized to project sound (speeches, commentary, dialog, music, movies, or other audible output), for example, to an audience having one or more recipients. The space 101 includes a target area 102 in which the audience would likely be positioned. As a result, the loudspeaker system 110 can be positioned and configured to generally target the target area 102.

In the configuration illustrated in FIG. 1, providing the loudspeaker system 110 for use in the space 101 provides significant challenges, particularly when the system has loudspeakers 112 mounted adjacent to a wall or ceiling that can impede or interfere with propagation of the sound toward the target area 102 in the space 101. For example, each loudspeaker 112 can include a waveguide 115 that receives sound waves generated by a driving element 114, such as a compression driver, a piezo driver, a dome driver, a cone driver, and/or the like. The waveguide 115 can be mounted to a front baffle 116 of the loudspeaker 112. The waveguide 115 (sometimes also referred to herein as a "speaker horn," a "horn waveguide," and/or the like) directs the acoustic waves away from the loudspeaker 112 toward the target area 102. When the loudspeaker 112 has a substantially symmetrical waveguide and is mounted adjacent to a wall, a ceiling, and/or other barrier, the waveguide 115 will produce a beamwidth initially symmetrical about a primary plane. For example, as illustrated by a first sound path 120 in FIG. 1, the waveguide 115 can shape the acoustic wave to exit the loudspeaker 112 at a first angle A off a plane of the front baffle 116 (which is, for example, perpendicular to the primary plane) to both the left and right (in the illustrated orientation) of the loudspeaker 112. As a result, as illustrated by the first sound path 120, each of the loudspeakers 112 can provide good acoustic coverage toward the center of the target area 102. However, the first sound path 120 will reflect off the adjacent wall of the space 101, thereby resulting in distortions to the sound, as well as areas with double coverage, and areas with only distorted coverage. In this configuration, the loudspeakers 112 do not resolve the challenges present when the loudspeaker is mounted next to the wall (or other interfering barrier), and the result is a suboptimal sound propagation to the target area 102 and also poor sound coverage to the sides of the target area 102.

Some loudspeakers 112 can be specifically constructed with a fixed asymmetric waveguide 115 to better suit the target area 102. For example, the customized waveguide 115 can have a beamwidth asymmetrical about the primary plane. For example, as illustrated by a second sound path 130, the customized waveguide 115 can shape the acoustic wave to exit the loudspeakers 112 at a second angle B toward the center of the target area 102 and a third angle C toward the sides of the target area 102. The second and third angles B and C can be set based on where the loudspeakers 112 are placed in the space 101 and the dimensions of the target area 102 in the space 101. As a result, the second sound path 130 provides better coverage over the target area 102 than the first sound path 120. Such loudspeakers with the specifically shaped waveguide 115 to fit the particular target area 102 and/or the space 101, however, have significant limitations if the loudspeakers were to be used in a different space 101 with a different target area 102.

Figure 2:
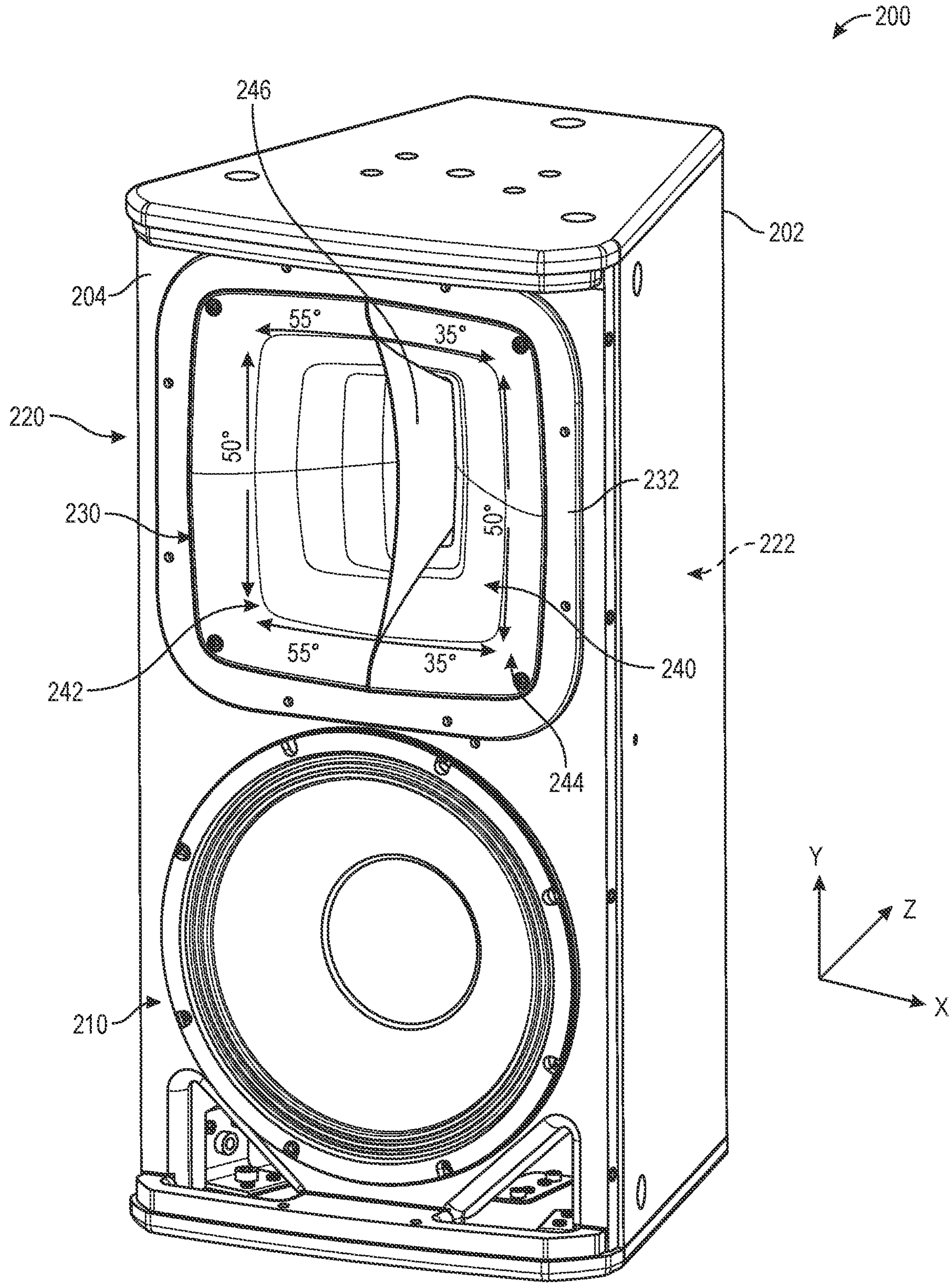
FIG. 2 is an partially schematic view of a loudspeaker configured in accordance with embodiments of the present technology.

FIG. 2 is a partially schematic view of a loudspeaker 200 configured in accordance with one or more embodiments of the present technology that can solve the challenges experienced by sound systems for installation in a wide range of spaces with different configurations. In the illustrated embodiment, the loudspeaker 200 includes a housing 202 with a front baffle 204. The loudspeaker 200 also includes a bass component 210 (e.g., a woofer or subwoofer component) and a horn-speaker component 220 each coupled to the front baffle 204. The bass component 210 can generate acoustic waves with a relatively low-frequency range (e.g., about 60-500 Hertz (Hz)) while the horn-speaker component 220 can generate acoustic waves with a midrange to high-frequency range (e.g., about 500 Hz-20 kHz).

In the illustrated embodiment, the horn-speaker component 220 includes a compression driver 222 (or other suitable driving element) and a customizable waveguide 230. The waveguide 230 has a frame 232 coupled between the compression driver 222 and the front baffle 204. The waveguide 230 also includes a waveguide insert 240 sealably and removably coupled to the frame 232. The waveguide insert 240 (sometimes also referred to herein as a "customizable waveguide system") receives, shapes, and directs acoustic waves generated by the compression driver 222. Meanwhile, the frame 232 provides structural and mounting support for the waveguide insert 240. The frame 232 can help ensure that the waveguide insert 240 remains rigidly fixed to the frame 232 and within the speaker's housing 202 to avoid creating distortions in the acoustic waves. As discussed in more detail below, the waveguide insert 240 having one shape or configuration can be easily and quickly removed from the frame 232 and replaced with another waveguide insert 240 with a different shape or configuration (and/or components of the waveguide insert 240 can be updated and/or changed to create a different shape or configuration), thereby adjusting the coverage angles for the loudspeaker 200. The customizability of the waveguide insert 240 enables the loudspeaker 200 to be customized to a given space.

To shape and direct the acoustic waves, the waveguide insert 240 includes a first half-horn 242, a second half-horn 244, and a divider 246. As discussed in more detail below, the divider 246 can be mounted between the two horn halves 242 and 244 and extends from a region adjacent to the compression driver 222 to a mouth region of the waveguide insert 240. The first half-horn 242 is coupled to a first longitudinal half of the frame 232 and shapes a first half of the acoustic waves. The second half-horn 244 is coupled to a second longitudinal half of the frame 232 and shapes a second half of the acoustic waves. The divider 246 acts to divide the acoustic waves generated by the compression driver 222 into halves as the acoustic waves travel from the compression driver 222, through the waveguide 230, and out of the mouth region.

In the illustrated embodiment, the first and second half-horns 242, 244 are asymmetrical about a primary axis (e.g., the y-axis parallel to the divider 246 in the illustrated orientation, also referred to herein as the primary plane) and symmetrical about a secondary axis (e.g., the x-axis perpendicular to the divider 246 in the illustrated orientation). More specifically, the first half-horn 242 has a wider left-right beamwidth (also referred to as a horizontal beamwidth) than the second half-horn 244. As a result, the waveguide insert 240 will direct the first half of the acoustic waves toward a wider area to the right of the loudspeaker 200 (with reference to the direction of travel of the acoustic wave) than to the left of the loudspeaker 200. However, because the first and second half-horns 242, 244 have the same up-down beamwidth (also referred to as a vertical beamwidth), the waveguide insert 240 will direct the acoustic waves in the same vertical field on either side of the divider 246. It is noted for purposes of illustration that the waveguide 230 in the embodiment illustrated in FIG. 2 that the divider 246 is positioned in a substantially vertical orientation, although the waveguide 230 and the divider 246 in other embodiments can be in a different orientation, such as a horizontal orientation or other angular orientation relative to a vertical/horizontal frame of reference.

In various embodiments, the beamwidth of a half-horn can be categorized and/or discussed by reference to the angle of coverage that the half-horn provides. The angle is measured from the longitudinal axis (e.g., the z-axis in the illustrated orientation) to the surface of the half-horn. A larger angle is associated with a wider (or larger) beamwidth. For example, in the illustrated embodiment, the first half-horn 242 has a left-right beamwidth of about 55 degrees ("°") while the second half-horn 244 has a left-right beamwidth of about 35°, thereby establishing the wider left-right beamwidth in the first half-horn 242. Further, both of the first and second half-horns 242, 244 have an up-down beamwidth of about 50°, thereby establishing their equal up-down coverage. It will be understood that while the first and second half-horns 242, 244 have been illustrated and discussed herein in the context of particular beamwidths, the waveguide insert 230 can include half-horns having any suitable left-right and/or up-down beamwidths (e.g., left-right and/or up-down beamwidths of 0°, 30°, 35°, 45°, 50°, 55°, 60°, 65°, 70°, 90°, 120°, and/or any other suitable angle).

Figure 3A:
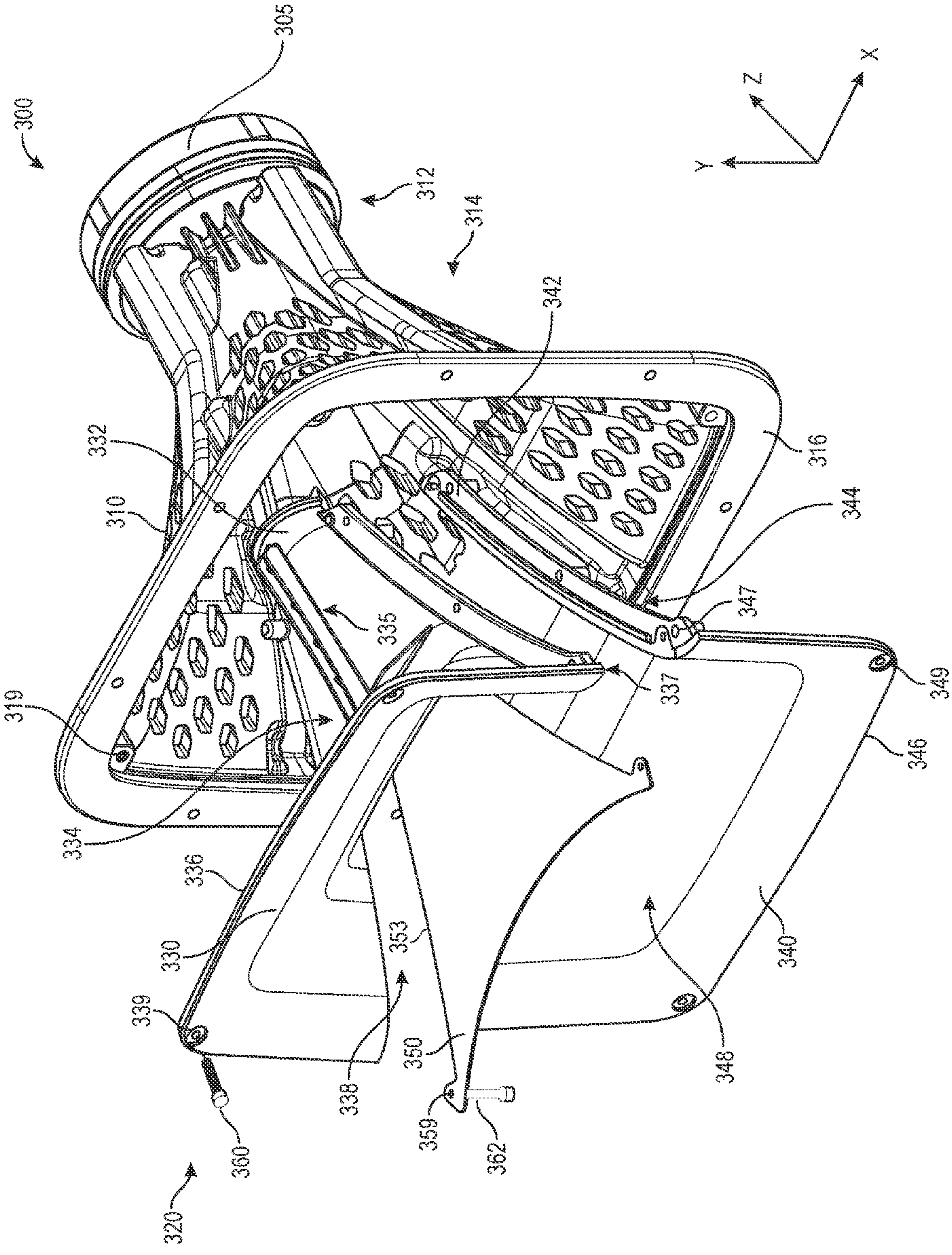
FIGS. 3A and 3B are exploded partially schematic views of a customizable waveguide configured in accordance with embodiments of the present technology.
Figure 3B:
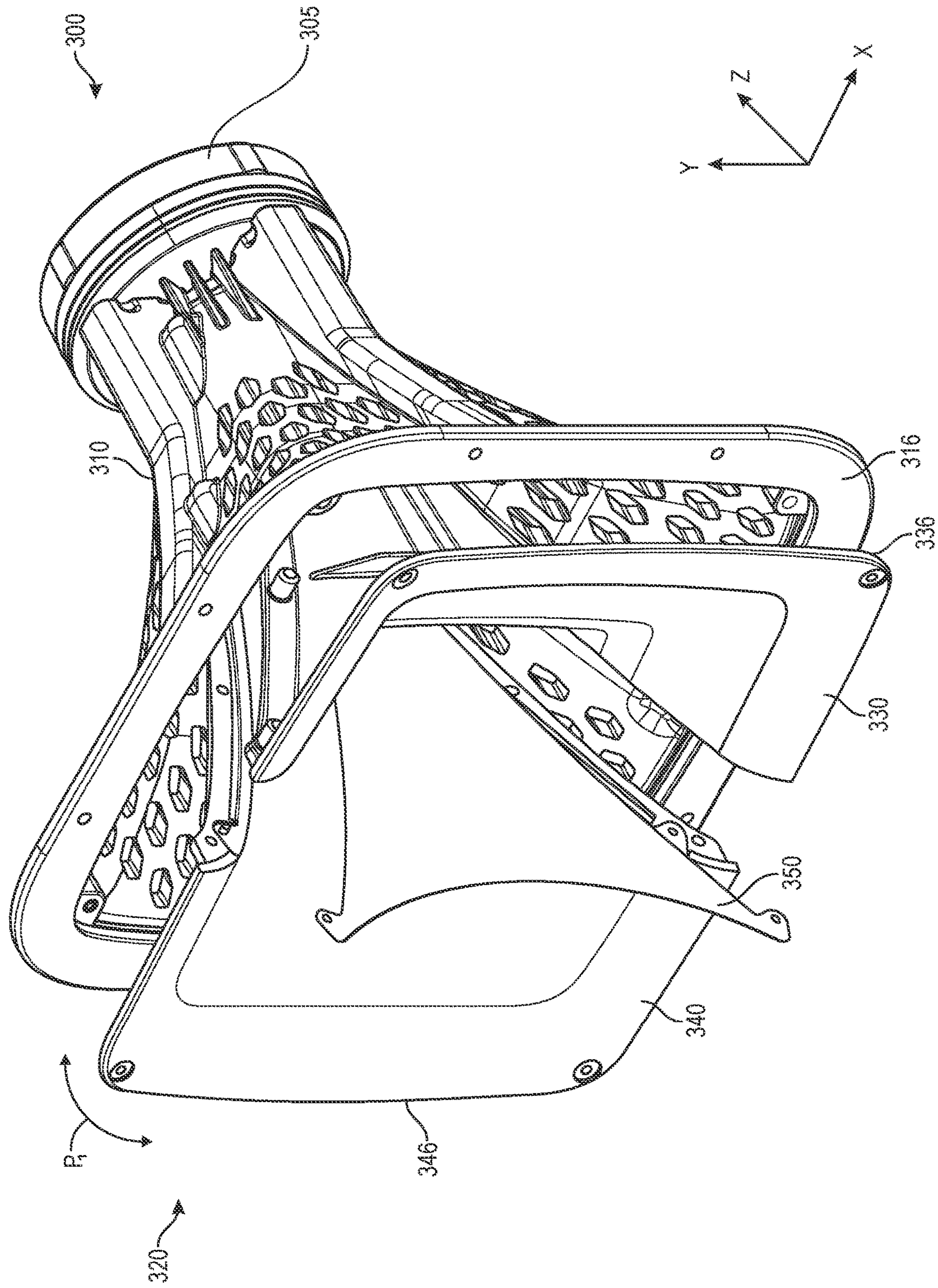

FIGS. 3A and 3B are exploded views of a customizable waveguide 300 configured in accordance with embodiments of the present technology. As illustrated in FIG. 3A, the waveguide 300 is generally similar to the waveguide 230 discussed above with reference to FIG. 2. For example, the waveguide 300 includes a driver 305, a frame 310 coupled to the driver 305, and a waveguide insert 320. The frame 310 provides a rigid structure that removably receives and supports the waveguide insert 320, the waveguide insert 320 includes asymmetric first and second half-horns 330 and 340, and a divider 350, which are shaped, positioned, and configured to shape and direct the acoustic waves exiting the waveguide 300.

In the embodiment illustrated in FIG. 3A, the frame 310 includes a throat 312, a neck 314, and a mouth 316. The throat 312 (sometimes also referred to as a "throat portion" and/or a "proximal end") is operably couplable to the driver 305. The neck 314 (sometimes also referred to as a "transition portion") expands radially out from the longitudinal axis of the frame 310 (e.g., the z-axis). The mouth 316 (sometimes also referred to as a "mouth portion" and/or a "distal end") is sealably couplable to a front baffle of the loudspeaker (e.g., front baffle 204 of FIG. 2) and forms the distal end through which the acoustic waves exit the waveguide 320. In the illustrated embodiment, the frame 310 is generally symmetrical about vertical and horizontal axes (e.g., the y-axis and the x-axis, respectively). As discussed in more detail below, the symmetry of the frame 310 can help enable quick rotation and/or other customization of the waveguide insert 320.

As further illustrated in FIG. 3A, the first half-horn 330 can include a first throat portion 332, a first neck portion 334, and a first mouth portion 336. The first half-horn 330 can be sealably coupled to a first longitudinal half of the frame 310. For example, the first mouth portion 336 can include through-openings 339. To sealably couple the first half-horn 330 to the frame 310, a user can insert fasteners 360 through the through-openings 339 on the first half-horn 330 and into receiving openings 319 on the frame 310. Once the fasteners 360 (e.g., screws, bolts, magnets, clips, and/or any other suitable element) are inserted, the first mouth portion 336 can be sealably connected to the mouth 316 and the first throat portion 332 can be sealably coupled to the throat 312. In the illustrated embodiment, the first half-horn 330 also includes protrusions 335. The protrusions 335 can help aid a user in coupling the first half-horn 330 (and the waveguide insert 320 more generally) by mating with grooves (e.g., ribs 524 discussed below with reference to FIG. 5) in the frame. The protrusions 335 can also help increase the rigidity of the first half-horn 330 to reduce distortions introduced by vibrations in the first half-horn 330.

Similar to the first half-horn 330, the second half-horn 340 includes a second throat portion 342, a second neck portion 344, and a second mouth portion 346. Further, the second half-horn 340 can be sealably coupled to a second longitudinal half of the frame 310. For example, second mouth portion 346 can include through-openings 349 that can receive the fasteners 360 in the same manner discussed above. Once the fasteners 360 (e.g., screws, bolts, magnets, clips, and/or any other suitable element) are inserted, the second mouth portion 346 can be sealably connected to the mouth 316 and the second throat portion 342 can be sealably coupled to the throat 312.

The divider 350 is positionable between the first and second half-horns 330, 340 to form an acoustic barrier along a primary axis therebetween. The divider 350 can be positioned in the interface between the first and second half-horns 330, 340 to create a first acoustic travel path 338 (also referred to herein as an "acoustic pathway") in the first half-horn 330 and a second acoustic travel path 348 in the second half-horn 340 and isolated from the first acoustic travel path 338. As a result, acoustic waves generated by the driver 305 are split between the first and second acoustic travel paths 338, 348 and shaped accordingly by the asymmetric first and second half horns 330, 340. In the illustrated embodiment, the divider 350 is captured and sealably coupled between the first and second half-horns 330, 340, thereby closing the open interface between the first and second half-horns 330, 340. The divider 350 can include edge portions 353 that contact the first and second half-horns 330, 340 and through-openings 359 that can receive fasteners 362. Before a user inserts the first half-horn 330 and/or the second half-horn 340 into the frame 310, the user, for example, can insert the fasteners 362 through the through-openings 359 on the divider 350 and into receiving openings 337, 347 on the first and second half-horns 330, 340 (respectively). In various embodiments, the user can couple each of the components of the waveguide insert 320 together before sealably coupling the waveguide insert 320 to the frame 310 and/or can couple the first and second half-horns 330, 340 to the frame 310 independently.

In some embodiments, the customizable waveguide 300 can use first and second half-horns 330, 340 with the same shape and contours, so the half-horns are mirror images of each other and symmetric about the vertical and horizontal axes. As a result, the beamwidths of the first and second half-horns 330, 340 are identical. In some such embodiments, the divider 350 can be omitted since the acoustic waves do not need to be divided. In other embodiments, the shape and contour of the first half-horn 330 is different than the shape and contour of the second half-horn, so that the first and second half-horns 330, 340 installed within the frame 310 are not mirror images of each other and can be asymmetric about one axis (e.g., asymmetric about the primary axis in the illustrated orientation) and symmetric about a second orthogonal axis (e.g., symmetric about the secondary axis in the illustrated orientation). The asymmetry along the primary axis allows the waveguide insert 320 to be customized to a space in which the loudspeaker (e.g., the loudspeaker 200 of FIG. 2) will be utilized. The symmetry along the secondary axis can help ensure that the first and second half-horns 330, 340 form a sealed connection with the divider 350 when the waveguide insert 320 is constructed (e.g., by allowing the edges of the divider 350 to be uniformly matched to both the first and second half-horns 330, 340). In some embodiments, however, the first and second half-horns 330, 340 are asymmetric about both of the primary and secondary axes. The additional asymmetry allows the waveguide insert 320 to be further customized to a space in which the loudspeaker (e.g., the loudspeaker 200 of FIG. 2) will be utilized.

The modular construction of the waveguide insert 320 also allows the components and/or orientation of the waveguide 300 to be further customized. For example, as illustrated in FIG. 3B, the waveguide insert 320 can be rotated along a rotational path $P_1$ (e.g., rotated about a longitudinal axis of the waveguide 300). In the illustrated embodiment, the waveguide insert 320 has been rotated 90 degrees such that the vertical axis is the primary axis and the horizontal axis is the secondary axis.

As discussed above, the rotation can allow a loudspeaker with a waveguide insert 320 asymmetrical about the primary axis to be customized for varying spaces. Purely by way of example, the orientation illustrated in FIG. 3B can be suitable for the loudspeakers 112 illustrated in FIG. 1 to provide a narrow beamwidth toward the periphery of the target area 102 and a wide beamwidth toward the center of the target area 102. In another example, the orientation illustrated in FIG. 3A can be suitable for a loudspeaker carried by the ceiling of a space (e.g., the ceiling-mounted loudspeakers in a movie theater) to provide a narrow beamwidth toward the ceiling of the space and a wide beamwidth into the rest of the space.

As further illustrated in FIG. 3B, the mouth 316 of the frame 310 can have a perimeter shape symmetric about the vertical and/or horizontal axes to aid in the rotation of the waveguide insert 320. In the illustrated embodiment, for example, the mouth 316 has a perimeter with a generally square shape (e.g., a square with rounded corners and/or convex sides) while the first and second mouth portions 336, 346 each have perimeters matching half of the generally square shape. As a result, the waveguide insert 320 can easily be decoupled from the frame 310, rotated by any multiple of 90 degrees about the longitudinal axis, then recoupled to the frame 310. Further, the match in shapes between the perimeter of the mouth 316 and the first and second mouth portions 336, 346 can help improve the seal between the frame 310 and the waveguide insert 320 by simplifying the alignment.

It will be understood that, in various embodiments, the waveguide insert 320 can be broken down into additional components to further customize the waveguide insert 320. Purely by way of example, the first and/or second half horns 330, 340 of the waveguide insert 320 can be swapped for other half-horns with other beamwidths. In another example, the waveguide insert 320 can include quarter-horns in place of the first and second half-horns 330, 340 illustrated in FIGS. 3A and 3B. In such embodiments, the waveguide insert 320 can include a divider that splits acoustic waves into four components, each of which is independently shaped by one of the quarter-horns (e.g., with four varying beamwidths), thereby allowing the waveguide insert 320 to be further customized to a space. Further, it will be understood that the additional customization does not require a different frame to be used in the loudspeaker. As a result, the frame 310 illustrated in FIGS. 3A and 3B can link the loudspeaker to a wide array of customized waveguide inserts.

Figure 4:
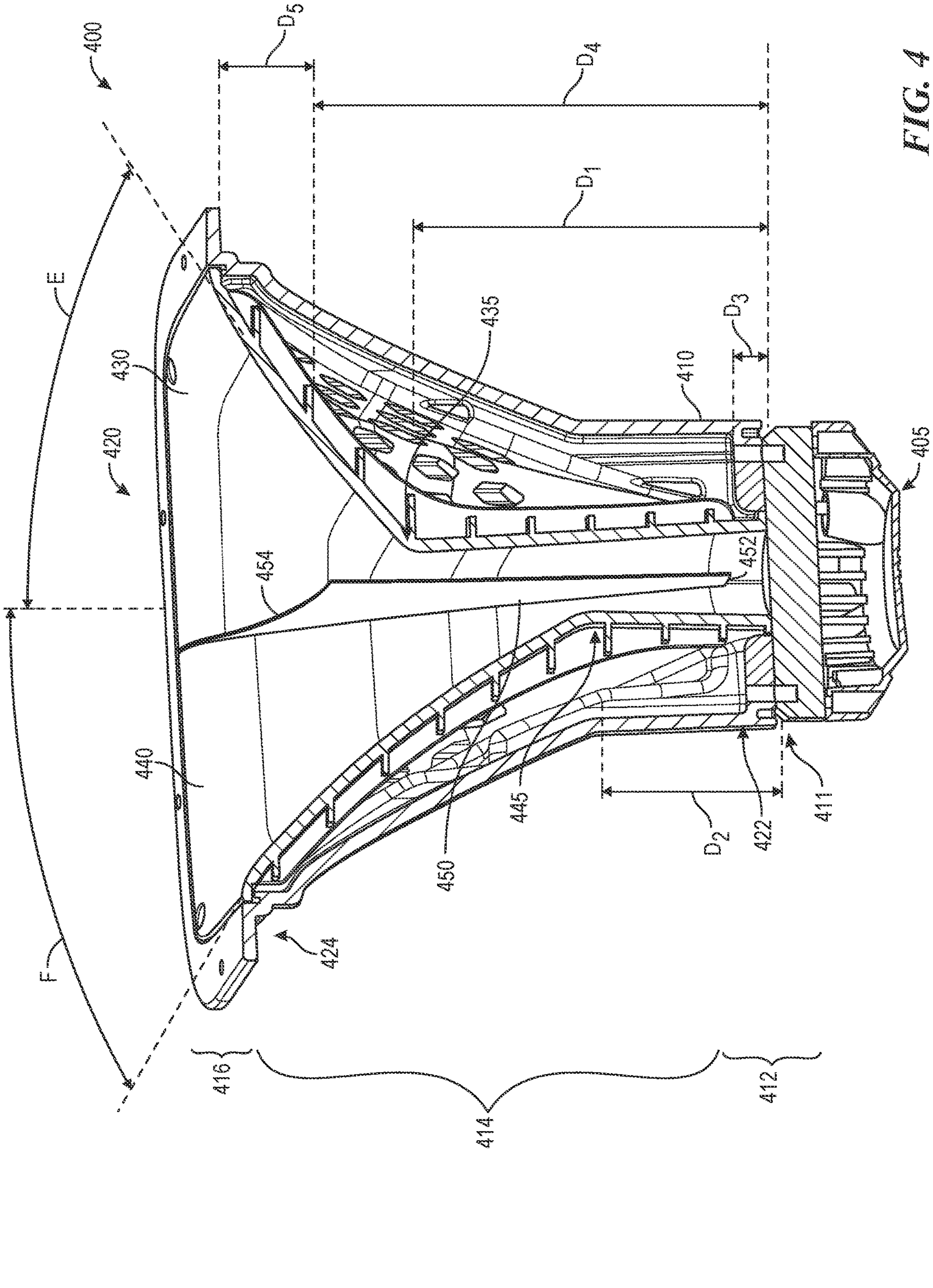
FIG. 4 is a partial cross-sectional view of a customizable waveguide configured in accordance with embodiments of the present technology.

FIG. 4 is a partial cross-sectional view of a customizable waveguide 400 configured in accordance with embodiments of the present technology. In the illustrated embodiment, the customizable waveguide 400 ("waveguide 400") is generally similar to the waveguide 300 discussed above with reference to FIGS. 3A and 3B. For example, the waveguide 400 includes a frame 410 and a waveguide insert 420. The frame 410 includes a throat 412, a neck 414, and mouth 416. The waveguide insert 420 includes a first half-horn 430, a second half-horn 440, and a divider 450.

As further illustrated in FIG. 4, the throat 412 includes a driver-interface 411 operably couplable to a compression driver 405 (or other suitable acoustic driver). In various embodiments, the driver-interface 411 can be operably coupled to the compression driver 405 via one or more fasteners, adhesives, gaskets (e.g., rubber gaskets), o-rings, and/or the like. As a result of the operable coupling between the compression driver 405 and the throat 412, acoustic waves generated by the compression driver 405 are directed into the waveguide 400. Further, the waveguide insert 420 can be sealably coupled to the throat 412 at a first interface 422. The seal at the first interface 422 can be created by one or more fasteners, gaskets, o-rings, and/or the like when the waveguide insert 420 is coupled to the frame 410 (e.g., using the fasteners 360 discussed above with reference to FIG. 3A). As a result of the sealed coupling between the throat 412 and the waveguide insert 420, acoustic waves generated by the compression driver 405 are directed into the waveguide insert 420. Still further, the waveguide insert 420 can be sealably coupled to the mouth 416 at a second interface 424. The seal at the second interface 424 can, similarly, be created via one or more fasteners, gaskets, o-rings, and/or the like. The sealed coupling helps ensure that the acoustic waves shaped by the waveguide insert 420 are projected outward with few (or no) distortions from movement around the second interface 424.

FIG. 4 also illustrates an asymmetrical embodiment of the waveguide insert 420 that provides varying beamwidths to the resulting acoustic waves. For example, in the illustrated embodiment, the first half-horn 430 has a first pinch point 435 (sometimes also referred to herein as an "inflection point" and/or a "pivot point") a first distance $D_1$ from the driver-interface 411. The first half-horn 430 is generally straight to the first pinch point 435, then slopes peripherally outward at first angle E (from the vertical axis) toward the second interface 424. The first angle E defines the beamwidth of the first half-horn 430. Similarly, the second half-horn 440 has a second pinch point 445 a second distance $D_2$ from the driver-interface 411. The second half-horn 440 is generally straight to the second pinch point 445, then slopes peripherally outward at a second angle F toward the second interface 424. The second angle F defines the beamwidth of the second half-horn 440.

As illustrated in FIG. 4, the first distance $D_1$ is greater than the second distance $D_2$, so the first pinch point 435 is positioned distal to the second pinch point 445 with respect to the driver-interface 411. As a result, the first angle E is greater than the second angle F (e.g., because the first half-horn 430 must transition more quickly than the second half-horn 440). Therefore, in the illustrated embodiment, the first half-horn 430 has a wider beamwidth than the second half-horn 440. As discussed above, the varying beamwidths of different half-horns can be used to customize the waveguide insert 420 as suitable for a space. Purely by way of example, the narrower beamwidth of the second half-horn 440 may be used to direct acoustic waves toward the periphery of the target area 102 in FIG. 1, while the wider beamwidth of the first half-horn may be used to direct acoustic waves toward the center of the target area 102.

As further illustrated in FIG. 4, the divider 450 includes a first edge 452 (e.g., a proximal edge) and a second edge 454 (e.g., a distal edge) opposite the first edge 452. The first edge 452 is positioned a third distance $D_3$ from the driver-interface 411 that is non-zero. As a result, the first edge 452 is positioned a non-zero distance distally from the first interface 422. The non-zero separation between the first edge 452 and the driver-interface 411 allows acoustic waves from the compression driver 405 to initially enter the waveguide insert 420 before being split into halves (or any other suitable split, such as thirds, quarters, eighths, and the like). The non-immediate split of the acoustic waves can improve the quality of the resulting waves. For example, by spacing the first edge 452 apart from the source of the acoustic waves, the waveguide insert 420 can reduce (or eliminate) reflections, resonance, and/or interference from the first edge 452 on the acoustic waves and/or the compression driver 405. Larger distances between the first edge 452 and the source of the acoustic waves result in more consistent acoustic coverage for the resulting waves. However, larger distances between the first edge 452 and the source of the acoustic waves also result in larger effects from acoustic cancellation in embodiments where the waveguide insert 420 is asymmetric about one or more axes. Furthermore, the acoustic cancellation can be centered around important audio ranges (e.g., between about 1 kHz and 1.5 kHz, or around 1.1 kHz). In contrast, shorter distances between the first edge 452 and the source of the acoustic waves result in some variance in the acoustic coverage but can reduce the effects of acoustic cancellation below a range audible to the human car. As a result, the third distance $D_3$ can be selected to balance the tradeoffs between larger and smaller distances. In various embodiments, the third distance $D_3$ can be between about 10 millimeters (mm) and about 50 mm, or about 16 mm.

A central portion of the second edge 454 of the divider 450 is positioned a fourth distance $D_4$ from the driver-interface 411 and a fifth distance $D_5$ from the second interface 424. The fourth distance $D_4$ is greater than the first distance $D_1$ (and the second distance $D_2$) while the fifth distance $D_5$ is non-zero. The second edge 454 of the divider 450 is positioned distal to the first and second pinch points 435, 445 but within the waveguide insert 420. The distal positioning of the second edge 454 with respect to the first and second pinch points 435, 445 allows the divider 450 to keep the acoustic waves in the first and second half-horns 430, 440 separate until after the acoustic waves have been shaped in their respective halves. The divider 450 can be configured to close the open interface between the first and second half-horns 430, 440 until after the respective acoustic waves are shaped in the first and second half-horns 430, 440. After the acoustic waves are shaped, the interaction between the waves does not result in interference between the waves and/or affect the beamwidths of the first and second half-horns 430, 440. The proximal positioning of the second edge 454 with respect to the second interface 424 (and therefore the mouth 416) allows the acoustic waves to begin interacting before the acoustic waves interact with ambient air external of the waveguide insert 420. The interaction can allow the acoustic waves to combine before being incident on external ambient air, thereby reducing (or minimizing) distortion on the resulting acoustic waves.

Figure 5A:
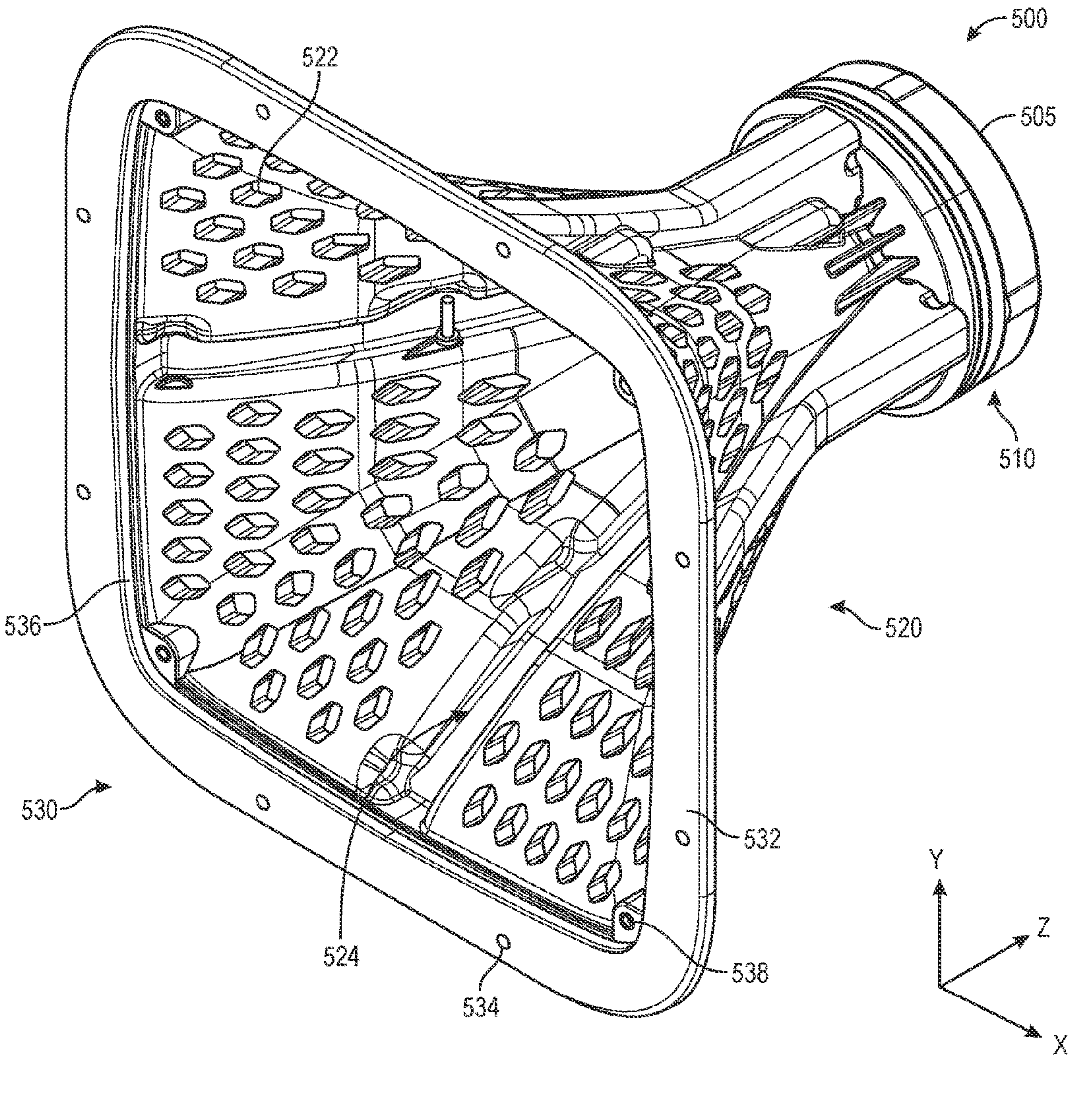
FIG. 5A is a partially schematic view of a frame for a customizable waveguide configured in accordance with embodiments of the present technology.
Figure 5B:
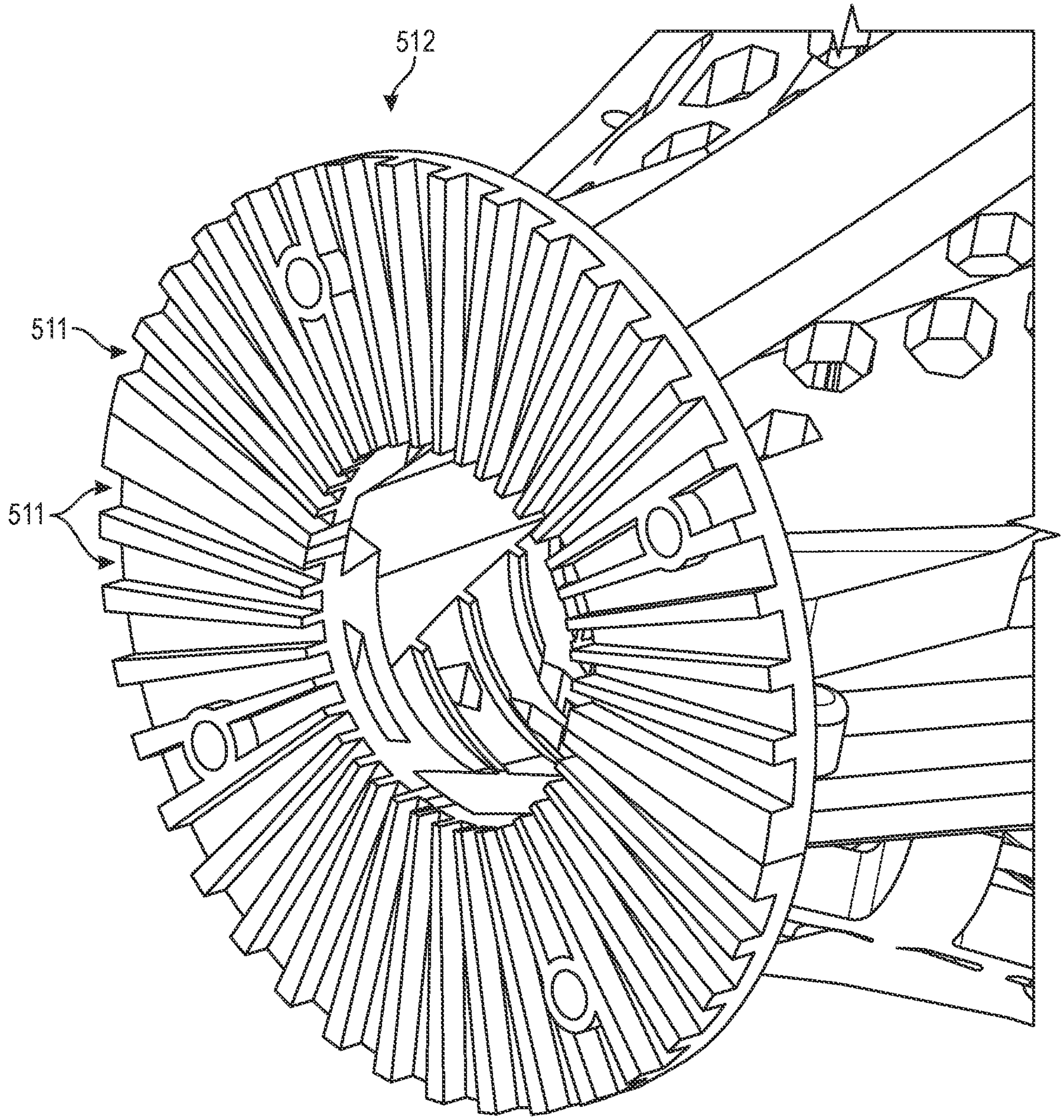
FIG. 5B is an enlarged rear, partially schematic view of the frame of FIG. 5A.

FIG. 5A is a partially schematic view of a frame 500 for a customizable waveguide (e.g., the waveguide 400 of FIG. 4) configured in accordance with embodiments of the present technology. In the illustrated embodiment, the frame 500 includes a throat 510, a neck 520, and a mouth 530. As discussed above, the throat 510 (sometimes also referred to as a "first end region") is operably couplable to a compression driver 505 (or other suitable driver) to direct acoustic waves into the waveguide. FIG. 5B is a rear view of the frame 500 of FIG. 5A illustrating additional details on the throat 510. As illustrated in FIG. 5B, the throat 510 can include radial slots 511 that help integrate the frame 500 with the compression driver 505 (FIG. 5A).

Returning to FIG. 5A, the neck 520 transitions (e.g., radially expands and/or the like) from a first width at the throat 510 to a second width at the mouth 530. In the illustrated embodiment, the neck 520 includes openings 522 that can reduce the weight of the frame 500 and/or allow air to escape as a waveguide insert is coupled to the frame 500.

In some embodiments, however, the neck 520 does not include the openings 522. In some such embodiments, the frame 500 is sealably coupled to the compression driver 505 and/or the front baffle (e.g., front baffle 204 of FIG. 2) and/or another suitable surface. Additionally, or alternatively, the neck 520 can include ribs 524 (sometimes also referred to herein as "grooves," "mounting tracks," and/or the like). The ribs 524 can provide additional rigidity to the frame 500 to reduce (or minimize) distortions in the acoustic waves shaped by the waveguide. Additionally, or alternatively, the ribs 524 can help guide a waveguide insert being coupled to the frame 500. For example, the waveguide insert can include one or more protrusions (e.g., the protrusions 335 of FIG. 3A) that nest with the ribs 524 to help guide the coupling of the waveguide insert into the frame 500 and/or help stabilize the waveguide insert once coupled to the frame 500.

The mouth 530 (sometimes also referred to as a "second end region") is sealably couplable to an external surface of a loudspeaker (e.g., the front baffle 204 of FIG. 2) and a waveguide insert (e.g., the waveguide insert 320 of FIG. 3A). In the illustrated embodiment, the mouth 530 includes an external surface 532 that includes one or more first openings 534 (eight shown in the illustrated embodiment). The first openings 534 can receive a fastener (e.g., screws, bolts, magnets, clips, and/or any other suitable elements) to couple the mouth 530 to the external surface of a loudspeaker. The mouth 530 also includes a gasket interface 536 with one or more second openings 538. The gasket interface 536 can help ensure that the waveguide insert is sealably coupled to the frame 500 and/or help reduce (or minimize and/or eliminate) distortions from movement at the gasket interface 536. The second openings 538 can receive fasteners (e.g., screws, bolts, magnets, clips, and/or any other suitable elements) to couple and secure the waveguide insert to the frame 500.

As discussed above, the frame 500 can be symmetric about vertical and/or horizontal axes (e.g., the y-axis and the x-axis, respectively). The symmetry can allow the waveguide insert to be rotated between various orientations and/or allow the half-horns in the waveguide insert to be easily swapped to customize the beamwidth coverage from the resulting waveguide. In the illustrated embodiment, the external surface 532 of the mouth 530 has a generally square perimeter (in the illustrated embodiment, a square with rounded corners and slightly convex sides). In various other embodiments, the external surface 532 of the mouth 530 can have various other shapes. For example, the perimeter can be a perfect square, a generally hexagonal shape (or perfect hexagon), a generally octagonal shape (or perfect octagon), a circle, a rectangle, and/or any other suitable shape.

Figure 6:
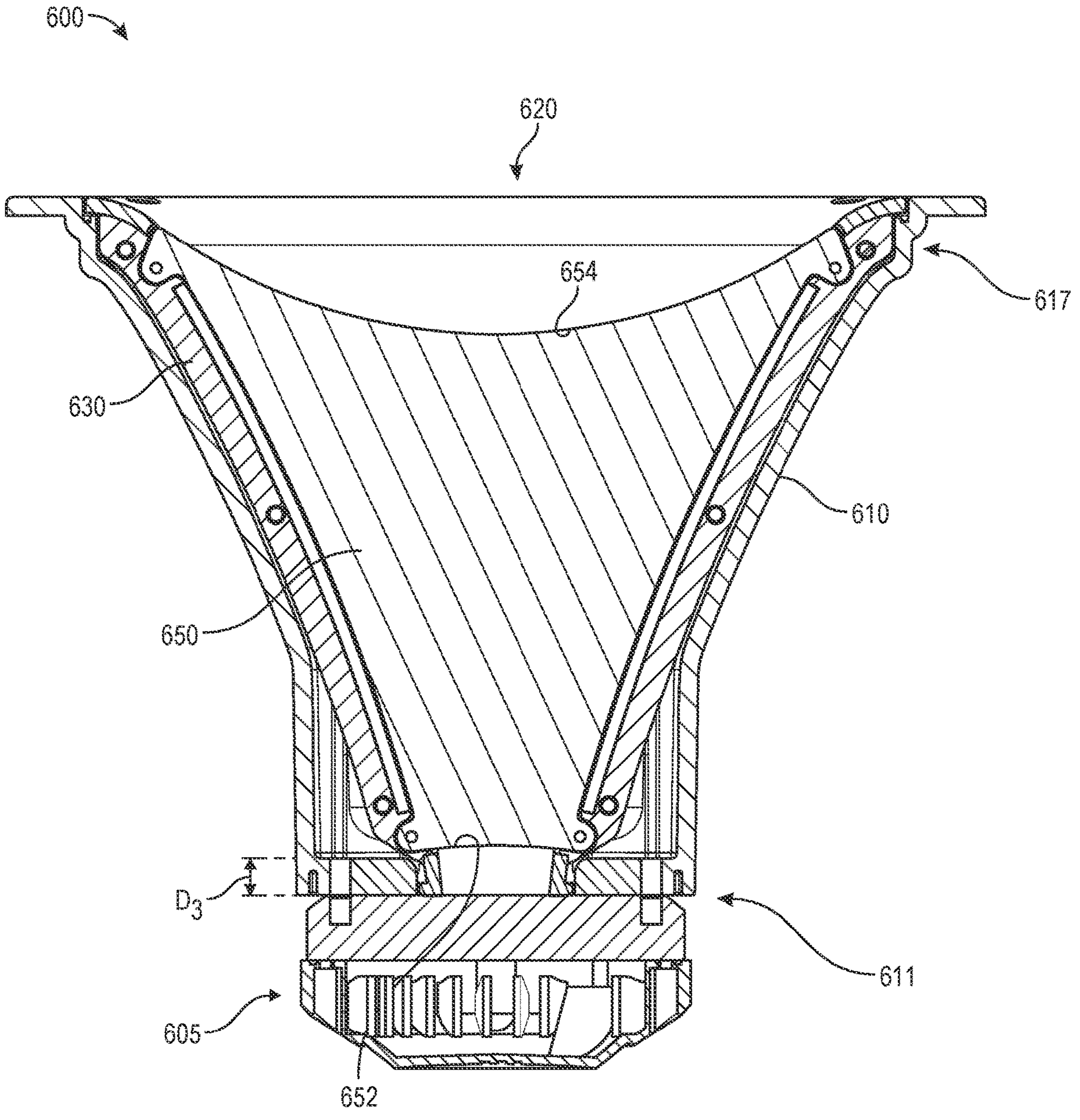
FIG. 6 is a partial cross-sectional view of a customizable waveguide configured in accordance with further embodiments of the present technology.

FIG. 6 is a partially cross-sectional view of a customizable waveguide 600 configured in accordance with further embodiments of the present technology. In the illustrated embodiment, the customizable waveguide 600 ("waveguide 600") is generally similar to the waveguide 300 discussed above with reference to FIGS. 3A and 3B. For example, the waveguide 600 includes a frame 610 and a waveguide insert 620 that includes a divider 650 captured between a first half-horn 630 and a second half-horn (not shown because of the cross-sectional view orientation).

Similar to the divider 450 discussed above with reference to FIG. 4, the divider 650 has a first edge 652 (e.g., a proximal edge) spaced apart from an interface 611 with the compression driver 605 by the third distance $D_3$. In the illustrated embodiment, however, the first edge 652 has a concave curve (e.g., such that a central portion of the first edge 652 is spaced farther from the interface 611 than peripheral portions of the first edge 652). The concave shape helps spread any reflections, resonance, and/or distortions caused by the split of acoustic waves at the first edge 652 across a variety of frequencies (e.g., rather than spiking around a single frequency). As a result, the reflections, resonance, and/or distortions can be imperceptible to a human car.

As further illustrated in FIG. 6, the divider 650 has a second edge 654 (e.g., a distal edge) spaced apart from a second interface 617 between the frame 610 and the waveguide insert 620 (e.g., at the mouth of the waveguide 600). As discussed above, the spacing between the second edge 654 and the second interface 617 helps reduce compounding negative effects (e.g., reflections, resonance, and/or distortions) by mixing the acoustic waves before they are incident on external ambient air outside of the waveguide.

Further, similar to the first edge 652, the second edge 654 has a concave curve (e.g., such that a central portion of the second edge 654 is spaced farther from the second interface 617 than peripheral portions of the second edge 654). The concave shape helps spread any reflections, resonance, and/or distortions caused by diffraction of the acoustic waves at the second edge 654 and/or interactions as the acoustic waves rejoin to be spread across a variety of frequencies. As a result, the reflections, resonance, and/or distortions can be imperceptible to a human car. In some embodiments, the shape of the concave curve is configured to spread the reflections, resonance, and/or distortions across the entire spectrum of frequencies generated by the compression driver 605. The complete spread can minimize the effects at any given frequency. In some embodiments, the shape of the concave curve is configured to spread the reflections, resonance, and/or distortions across only a subset of the spectrum of frequencies generated by the compression driver 605. The subset can be selected based on a preferred subset for the effects (e.g., rarely used frequencies, frequencies that are hard to perceive, and the like).

Figure 7:
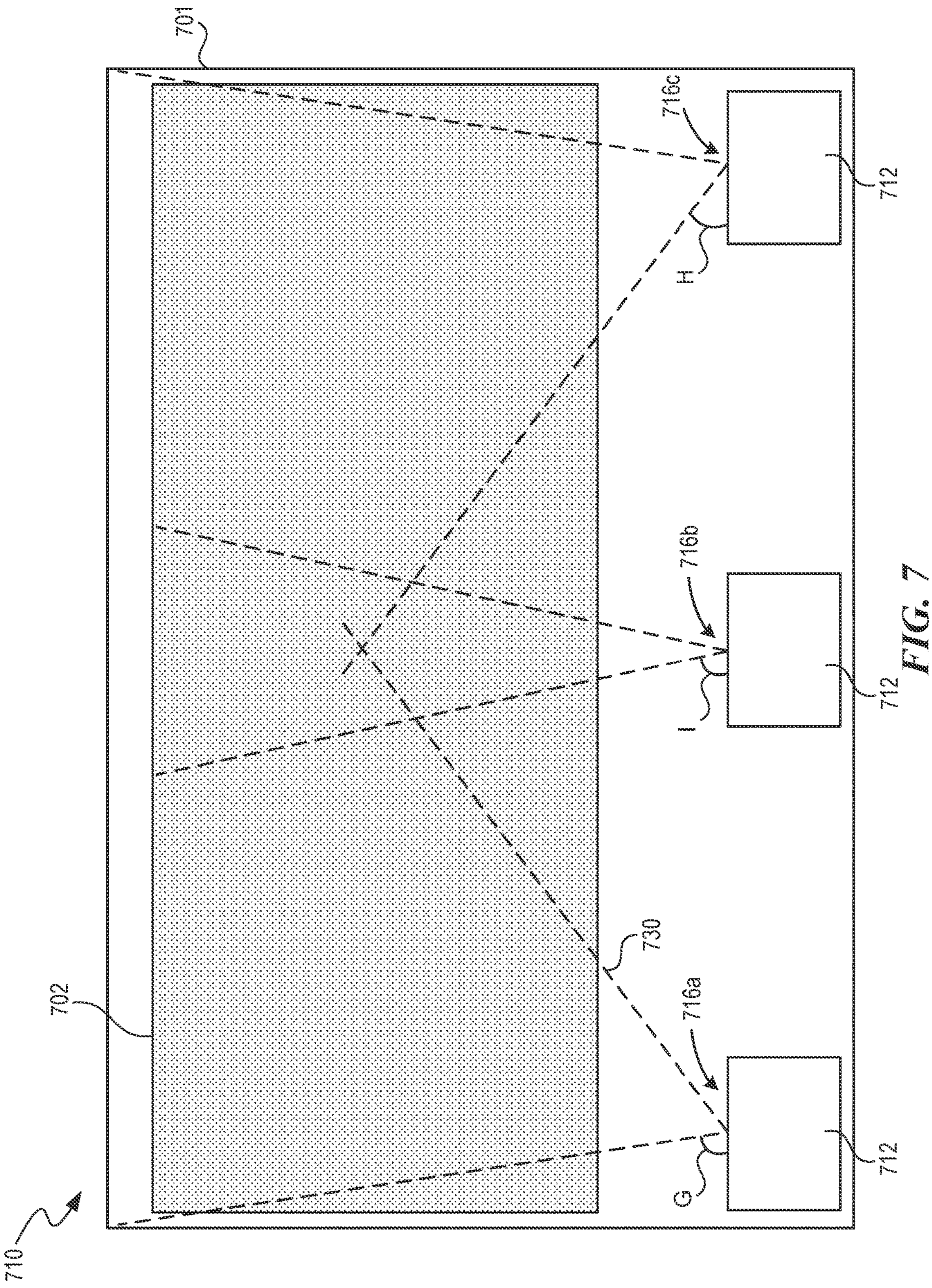
FIG. 7 is a schematic top view of a space employing loudspeakers with customizable waveguides configured in accordance with embodiments of the present technology.

FIG. 7 is a schematic top view of a space 701 employing a loudspeaker system 710 configured in accordance with embodiments of the present technology. In the illustrated embodiment, the space 701 includes a target area 702 (e.g., an audience zone and/or listening zone), and the loudspeaker system 710 includes three loudspeakers 712 configured to direct acoustic waves 730 toward the target zone. Further, each of the loudspeakers 712 includes a customizable waveguide 716 (referred to individually as first-third waveguides 716*a*-716*c*) to tailor the acoustic coverage of the loudspeaker system 710 to the target area 702.

For example, the first and third waveguides 716*a*, 716*c* each have asymmetric beamwidths with a peripheral component at first angle G (above a front baffle of the loudspeakers 712) and a central component at second angle H. The first angle G is greater than the second angle H. That is, the first and third waveguides 716*a*, 716*c* have a relatively narrow beamwidth directed at the periphery of the target area 702 and a relatively wide beamwidth directed at the central portion of the target area 702. The relatively narrow beamwidth helps to reduce reflections from the side of the space 701 and/or cover the entirety of the periphery of the target area 702. The relatively wide beamwidth helps cover a large portion of the central portion of the target area 702. The first angle G (and the corresponding relatively narrow beamwidth) can be created by a first half-horn in a customizable waveguide insert while the second angle H (and the corresponding relatively narrow beamwidth) can be created by a second half-horn in the customizable waveguide insert.

Further, the waveguide insert can be rotated 180 degrees between the first waveguide 716*a* and the third waveguide 716*c* to create the inverted coverage pattern.

Further, the second waveguide 716*b* has symmetric beamwidths directed toward the central portion of the target area 702 at a third angle I. The third angle I (and the corresponding beamwidths) can be created by a third half-horn installed in the second waveguide 716*b* (e.g., in place of the first and second half-horns). The second waveguide 716*b* can help cover dead zones in the central portion of the target area 702 (e.g., zones that are not within the beamwidths from the first and third waveguides 716*a*, 716*c*) to help improve the coverage from the loudspeaker system 710. In some embodiments, the third angle I is relatively large, thereby resulting in a narrow beamwidth from the second waveguide 716*b* to cover only a small section of the central portion of the target area 702 with minimal overlap with the beamwidths from the first and third waveguides 716*a*, 716*c*. In some embodiments, the third angle I is relatively small, thereby resulting in a wide beamwidth from the second waveguide 716*b* to cover a larger section of the central portion of the target area 702 to reduce (or eliminate) dead zones.

Because the waveguides 716 are customizable ad-hoc, the loudspeaker system 710 can be tailored to any number of spaces and/or to any number of acoustic needs without needing a wide variety of the loudspeakers 712. For example, some events (e.g., speaking events and/or conferences) may prefer to prioritize coverage of the target area 702 to reduce (or eliminate) dead zones without much emphasis on reducing overlaps. In such embodiments, the second waveguide 716*b* can be given a wide beamwidth to ensure maximum coverage. Other events (e.g., movies, concerts, and the like) may prefer to minimize the number of overlaps while keeping the number of dead zones relatively low. In such embodiments, the second waveguide 716*b* can be given a narrow beamwidth to cover dead zones in the target area 702 while minimizing overlap with the beamwidths from the first and third waveguides 716*a*, 716*c*. Because only the second waveguide 716*b* needs to be altered, the loudspeaker system 710 can be quickly tailored to the varying events. Further, because the second waveguide 716*b* can be removed from the loudspeaker 712, customized, and reinserted into the loudspeaker 712, or even replaced with yet another waveguide (not shown), to customize the coverage, the loudspeaker system 710 does not require numerous different loudspeakers 712 to be swapped in and out. As a result, the loudspeaker system 710 can be flexible between varying needs in different spaces and/or at different events.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A waveguide for use in a loudspeaker having a driver and a front baffle, the waveguide comprising:
   - a frame having a first end region positionable adjacent to the driver in the loudspeaker and a second end region opposite the first end region and positionable adjacent to the front baffle of the loudspeaker when the first end region is adjacent to the driver, wherein the second end region of the frame is symmetric about orthogonal primary and secondary axes of the frame; and
   - a waveguide insert having:
     - a first half-horn couplable to a first longitudinal half of the frame, the first half-horn extending from the first end region to the second end region;
     - a second half-horn removably coupled to the first half-horn and couplable to a second longitudinal half of the frame opposite the first longitudinal half, the second half-horn extending from the first end region to the second end region; and
     - a divider positioned between the first half-horn and the second half-horn, the divider extending from the first end region to the second end region;
   - wherein the waveguide insert is asymmetric relative to the primary or secondary axis.

2. The waveguide of Example 1 wherein the waveguide insert is removably couplable to the frame.

3. The waveguide of Example 2 wherein the waveguide insert is configured to be decoupled from the frame in a first orientation, rotated about a longitudinal axis of the frame while decoupled, and recoupled to the frame in a second orientation different from the first orientation.

4. The waveguide of Example 1 wherein the first half-horn has a first acoustic beamwidth, and wherein the second half-horn has a second acoustic beamwidth different from the first acoustic beamwidth.

5. The waveguide of Example 1 wherein the first end region of the frame is configured to be sealed with the driver when positioned in the loudspeaker.

6. The waveguide of Example 1 wherein the divider has an edge positionable adjacent to the first end region of the frame, and wherein the edge has a concave curve spaced apart from a throat of the frame in the first end region.

7. The waveguide of Example 1 wherein each of the first and second half-horns have a pinch point, wherein the divider has an edge positioned distal to the pinch point of each of the first and second half-horns with respect to the first end region of the frame when the divider is positioned between the first and second half-horns, and wherein the edge has a concave curve.

8. The waveguide of Example 1 wherein the first half-horn has a first shape and the second half-horn has a second shape different than the first shape and not a mirror image of the first shape.

9. A loudspeaker, comprising:
   - a housing having a front baffle;
   - a driver positioned in the housing;
   - a waveguide frame having a first end region coupled to the driver and a second end region carried by the front baffle; and
   - a customizable waveguide insert removably couplable to the waveguide frame and extending from the first end region to the second end region, the customizable waveguide insert comprising:
     - a first half-horn;
     - a second half-horn removably coupled to the first half-horn; and
     - a divider configured to be positioned between the first half-horn and the second half-horn before the first and second half-horns are coupled together.

10. The loudspeaker of Example 9 wherein the first half-horn defines a first acoustic pathway having a first acoustic beamwidth, and the second half-horn defines a second acoustic pathway having a second acoustic beamwidth, and wherein the divider blocked interaction between acoustic waves in the first and second acoustic pathways.

11. The loudspeaker of Example 9 wherein the first half-horn has a first shape and the second half-horn has a second shape different than the first shape and not a mirror image of the first shape.

12. The loudspeaker of Example 9 wherein the first half-horn has a first acoustic beamwidth, and wherein the second half-horn has a second acoustic beamwidth.

13. The loudspeaker of Example 12 wherein the customizable waveguide insert further comprises a third half-horn couplable to the first half-horn or the second half-horn and having a third beamwidth, and wherein the customizable waveguide insert is configured to be coupled to the waveguide frame with any two of the first, second, and third half-horns.

14. The loudspeaker of Example 9 wherein:

the waveguide frame includes a throat coupled to the driver in the first end region, a mouth coupled to the front baffle at the second end region, and a neck extending distally from the throat to the mouth; and the divider has an edge positioned distal to the throat of the frame when the customizable waveguide insert is coupled to the waveguide frame, wherein the edge has a concave curve.

15. The loudspeaker of Example 14 wherein:

the first and second half-horns each have an inflection point positioned in the neck when the customizable waveguide insert is coupled to the waveguide frame;

the edge of the divider is a first edge and the concave curve is a first concave curve; and the divider has a second edge positioned distal to the inflection point of each of the first and second half-horns when the customizable waveguide insert is coupled to the waveguide frame, wherein the second edge has a second concave curve.

16. The loudspeaker of Example 14 wherein:

the first half-horn has a first inflection point positioned in the neck when the customizable waveguide insert is coupled to the frame; and the second half-horn has a second inflection point positioned in the neck distal to the first inflection point when the customizable waveguide insert is coupled to the waveguide frame.

17. The loudspeaker of Example 9 wherein the first half-horn is removable from the second half-horn, the divider, and from the waveguide frame, wherein the first half-horn is interchangeable with a third half-horn that has a shape different than the first half-horn and that is removably connectable to the second half-horn, the divider, and the waveguide frame.

18. The loudspeaker of Example 9 wherein the second half-horn is coupled to the first half-horn via one or more first removable fasteners, and the customizable waveguide insert is coupled to the frame via one or more second removable fasteners.

19. A customizable waveguide system for use in a loudspeaker, the customizable waveguide system comprising:

a first partial horn extending in a longitudinal direction from a first throat portion to a first mouth portion, wherein the first partial horn comprises a first closed side and a first open side opposite the first closed side, and wherein the first partial horn is couplable to a rigid frame in the loudspeaker extending from a driver to a front baffle;

a second partial horn extending in the longitudinal direction from a second throat portion to a second mouth portion, wherein the second partial horn comprises a second closed side and a second open side opposite the second closed side, and wherein the second partial horn is couplable to the first partial horn to create an open interface between the first open side and the second open side; and a divider wall couplable between the first partial horn and the second partial horn in a position to close at least a portion of the open interface between the first open side the second open side.

20. The customizable waveguide system of Example 19, further comprising:

a third partial horn extending in the longitudinal direction from a third throat portion to a third mouth portion, wherein the third partial horn comprises a third closed side and a third open side opposite the third closed side, and wherein the third partial horn is couplable to (1) the first partial horn to create a second open interface between the first open side and the third open side, and/or (2) the second partial horn to create a third open interface between the second open side and the third open side, wherein:

the divider wall is further couplable between (A) the first partial horn and the third partial horn in a position to close at least a portion of the second open interface, and/or (B) the second partial horn and the third partial horn in a position to close at least a portion of the third open interface.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word “or” is expressly limited to mean only a single item exclusive from the other items in reference to a list of two or more items, then the use of “or” in such a list is to be interpreted as including (a) any single item in the list, (b) all of the items in the list, or (c) any combination of the items in the list. Furthermore, as used herein, the phrase “and/or” as in “A and/or B” refers to A alone, B alone, and both A and B. Additionally, the terms “comprising,” “including,” “having,” and “with” are used throughout to mean including at least the recited feature(s) such that any greater number of the same features and/or additional types of other features are not precluded. Further, the terms “approximately” and “about” are used herein to mean within at least within 10 percent of a given value or limit. Purely by way of example, an approximate ratio means within a ten percent of the given ratio.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments.

Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A waveguide for use in a loudspeaker having a driver and a front baffle, the waveguide comprising:

a frame having a first end region positionable adjacent to the driver in the loudspeaker and a second end region opposite the first end region and positionable adjacent to the front baffle of the loudspeaker when the first end region is adjacent to the driver, wherein the second end region of the frame is symmetric about orthogonal primary and secondary axes of the frame; and a waveguide insert having:

a first half-horn couplable to a first longitudinal half of the frame, the first half-horn extending from the first end region to the second end region;

a second half-horn removably coupled to the first half-horn and couplable to a second longitudinal half of the frame opposite the first longitudinal half, the second half-horn extending from the first end region to the second end region; and a divider positioned between the first half-horn and the second half-horn, the divider extending from the first end region to the second end region;

wherein the waveguide insert is asymmetric relative to the primary or secondary axis.

2. The waveguide of claim 1 wherein the waveguide insert is removably couplable to the frame.

3. The waveguide of claim 2 wherein the waveguide insert is configured to be decoupled from the frame in a first orientation, rotated about a longitudinal axis of the frame while decoupled, and recoupled to the frame in a second orientation different from the first orientation.

4. The waveguide of claim 1 wherein the first half-horn has a first acoustic beamwidth, and wherein the second half-horn has a second acoustic beamwidth different from the first acoustic beamwidth.

5. The waveguide of claim 1 wherein the first end region of the frame is configured to be sealed with the driver when positioned in the loudspeaker.

6. The waveguide of claim 1 wherein the divider has an edge positionable adjacent to the first end region of the frame, and wherein the edge has a concave curve spaced apart from a throat of the frame in the first end region.

7. The waveguide of claim 1 wherein each of the first and second half-horns have a pinch point, wherein the divider has an edge positioned distal to the pinch point of each of the first and second half-horns with respect to the first end region of the frame when the divider is positioned between the first and second half-horns, and wherein the edge has a concave curve.

8. The waveguide of claim 1 wherein the first half-horn has a first shape and the second half-horn has a second shape different than the first shape and not a mirror image of the first shape.

9. A loudspeaker, comprising:

a housing having a front baffle;

a driver positioned in the housing;

a waveguide frame having a first end region coupled to the driver and a second end region carried by the front baffle; and a customizable waveguide insert removably couplable to the waveguide frame and extending from the first end region to the second end region, the customizable waveguide insert comprising:

a first half-horn;

a second half-horn removably coupled to the first half-horn; and a divider configured to be positioned between the first half-horn and the second half-horn before the first and second half-horns are coupled together.

10. The loudspeaker of claim 9 wherein the first half-horn defines a first acoustic pathway having a first acoustic beamwidth, and the second half-horn defines a second acoustic pathway having a second acoustic beamwidth, and wherein the divider blocks interaction between acoustic waves in the first and second acoustic pathways.

11. The loudspeaker of claim 9 wherein the first half-horn has a first shape and the second half-horn has a second shape different than the first shape and not a mirror image of the first shape.

12. The loudspeaker of claim 9 wherein the first half-horn has a first acoustic beamwidth, and wherein the second half-horn has a second acoustic beamwidth.

13. The loudspeaker of claim 12 wherein the customizable waveguide insert further comprises a third half-horn couplable to the first half-horn or the second half-horn and having a third beamwidth, and wherein the customizable waveguide insert is configured to be coupled to the waveguide frame with any two of the first, second, and third half-horns.

14. The loudspeaker of claim 9 wherein:

the waveguide frame includes a throat coupled to the driver at the first end region, a mouth coupled to the front baffle at the second end region, and a neck extending distally from the throat to the mouth; and the divider has an edge positioned distal to the throat of the waveguide frame when the customizable waveguide insert is coupled to the waveguide frame, wherein the edge has a concave curve.

15. The loudspeaker of claim 14 wherein:

the first and second half-horns each have an inflection point positioned in the neck when the customizable waveguide insert is coupled to the waveguide frame;

the edge of the divider is a first edge and the concave curve is a first concave curve; and the divider has a second edge positioned distal to the inflection point of each of the first and second half-horns when the customizable waveguide insert is coupled to the waveguide frame, wherein the second edge has a second concave curve.

16. The loudspeaker of claim 14 wherein:

the first half-horn has a first inflection point positioned in the neck when the customizable waveguide insert is coupled to the frame; and the second half-horn has a second inflection point positioned in the neck distal to the first inflection point when the customizable waveguide insert is coupled to the waveguide frame.

17. The loudspeaker of claim 9 wherein the first half-horn is removable from the second half-horn, the divider, and from the waveguide frame, wherein the first half-horn is interchangeable with a third half-horn that has a shape different than the first half-horn and that is removably connectable to the second half-horn, the divider, and the waveguide frame.

18. The loudspeaker of claim 9 wherein the second half-horn is coupled to the first half-horn via one or more first removable fasteners, and the customizable waveguide insert is coupled to the frame via one or more second removable fasteners.

19. A customizable waveguide system for use in a loudspeaker, the customizable waveguide system comprising:

a first partial horn extending in a longitudinal direction from a first throat portion to a first mouth portion, wherein the first partial horn comprises a first closed side and a first open side opposite the first closed side, and wherein the first partial horn is couplable to a rigid frame in the loudspeaker extending from a driver to a front baffle;

a second partial horn extending in the longitudinal direction from a second throat portion to a second mouth portion, wherein the second partial horn comprises a second closed side and a second open side opposite the second closed side, and wherein the second partial horn is couplable to the first partial horn to create an open interface between the first open side and the second open side; and a divider wall couplable between the first partial horn and the second partial horn in a position to close at least a portion of the open interface between the first open side the second open side.

20. The customizable waveguide system of claim 19, further comprising:

a third partial horn extending in the longitudinal direction from a third throat portion to a third mouth portion, wherein the third partial horn comprises a third closed side and a third open side opposite the third closed side, and wherein the third partial horn is couplable to (1) the first partial horn to create a second open interface between the first open side and the third open side, and/or (2) the second partial horn to create a third open interface between the second open side and the third open side, wherein:

the divider wall is further couplable between (A) the first partial horn and the third partial horn in a position to close at least a portion of the second open interface, and/or (B) the second partial horn and the third partial horn in a position to close at least a portion of the third open interface.

* * * * *